(12) United States Patent
Prokhorov et al.

(10) Patent No.: US 11,067,200 B2
(45) Date of Patent: Jul. 20, 2021

(54) SELF-HEALING MICROVALVE

(71) Applicant: Toyota Motor Engineering & Manufacturing North America, Inc., Plano, TX (US)

(72) Inventors: Danil V. Prokhorov, Canton, MI (US); Umesh N. Gandhi, Farmington Hills, MI (US); Michael Paul Rowe, Pinckney, MI (US); Ryohei Tsuruta, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 45 days.

(21) Appl. No.: 16/169,310

(22) Filed: Oct. 24, 2018

(65) Prior Publication Data

US 2020/0132223 A1    Apr. 30, 2020

(51) Int. Cl.
*F16K 99/00* (2006.01)
*F16K 7/12* (2006.01)

(52) U.S. Cl.
CPC ...... *F16K 99/0049* (2013.01); *F16K 99/0011* (2013.01); *F16K 99/0015* (2013.01); *F16K 7/12* (2013.01)

(58) Field of Classification Search
CPC .. F04B 53/10; F16K 99/0011; F16K 99/0015; F16K 7/12; F16K 99/0049; B65D 90/56
USPC .................................................. 251/7, 129.06
See application file for complete search history.

(56) References Cited

U.S. PATENT DOCUMENTS

| 2,241,086 | A | * | 5/1941 | Gould | ..................... F15B 5/00 62/223 |
| 4,286,910 | A | | 9/1981 | Conrad | |
| 4,319,427 | A | | 3/1982 | Way, Jr. | |
| 4,726,656 | A | | 2/1988 | Schofield et al. | |
| 5,065,978 | A | * | 11/1991 | Albarda | ............... B41J 2/17596 251/129.17 |

(Continued)

FOREIGN PATENT DOCUMENTS

| JP | 2007097292 A | 4/2007 |
| KR | 20050056526 A | 6/2005 |

(Continued)

OTHER PUBLICATIONS

Knoss, "Next-gen flexible robots move and heal like us," CU Boulder Today, Jan. 4, 2018, retrieved from the Internet: <https://www.colorado.edu/today/2018/01/04/next-gen-flexible-robots-move-and-heal-us>, [retrieved Mar. 30, 2018] (6 pages).

(Continued)

*Primary Examiner* — Matthew W Jellett
(74) *Attorney, Agent, or Firm* — Christopher G. Darrow; Darrow Mustafa PC

(57) ABSTRACT

Self-healing microvalves are described herein. The self-healing microvalve can move from a first position to a second position using an electrical input and use a soft hydraulic assembly to return from the second position to the first position. The electrical input can create an electrostatic attraction, causing the compression of the soft hydraulic assembly and movement of the valve gate to seal the microvalve. The elasticity of the soft hydraulic assembly can then return the self-healing microvalve to the original state, once the electrical input is removed.

18 Claims, 6 Drawing Sheets

(56) References Cited

U.S. PATENT DOCUMENTS

| | | | |
|---|---|---|---|
| 6,120,002 A | 9/2000 | Biegelsen et al. | |
| 6,215,221 B1 | 4/2001 | Cabuz et al. | |
| 6,490,960 B1 | 12/2002 | Jackson et al. | |
| 6,685,442 B2 * | 2/2004 | Chinn | F04B 17/00 |
| | | | 251/129.06 |
| 6,939,291 B2 | 9/2005 | Phee Soo Jay | |
| 7,353,747 B2 | 4/2008 | Swayze et al. | |
| 7,484,735 B2 | 2/2009 | Verbrugge et al. | |
| 7,521,840 B2 | 4/2009 | Heim | |
| 7,673,562 B2 * | 3/2010 | Pattekar | B41C 1/00 |
| | | | 101/395 |
| 7,834,527 B2 | 11/2010 | Alvarez Icaza Rivera et al. | |
| 7,892,630 B1 | 2/2011 | McKnight et al. | |
| 7,901,524 B1 | 3/2011 | McKnight et al. | |
| 7,905,538 B2 | 3/2011 | Ukpai et al. | |
| 8,222,799 B2 * | 7/2012 | Polyakov | H01L 41/0474 |
| | | | 310/365 |
| 8,240,677 B2 | 8/2012 | Browne et al. | |
| 8,272,392 B2 * | 9/2012 | Pattekar | B01L 3/502738 |
| | | | 137/1 |
| 8,430,810 B2 | 4/2013 | Hassidov et al. | |
| 8,863,608 B2 | 10/2014 | Fischer et al. | |
| 9,061,118 B2 | 6/2015 | Shoham et al. | |
| 9,764,113 B2 | 9/2017 | Tuval et al. | |
| 9,790,968 B2 | 10/2017 | Yang et al. | |
| 10,058,647 B2 | 8/2018 | Roche et al. | |
| 10,293,718 B1 | 5/2019 | Ilievski et al. | |
| 10,631,083 B1 | 4/2020 | Gandhi et al. | |
| 10,640,033 B1 | 5/2020 | Gandhi et al. | |
| 10,682,903 B1 | 6/2020 | Gandhi et al. | |
| 10,682,931 B2 | 6/2020 | Rowe et al. | |
| 2002/0100888 A1 | 8/2002 | Sharma et al. | |
| 2004/0107829 A1 | 6/2004 | Davis et al. | |
| 2004/0261411 A1 | 12/2004 | MacGregor | |
| 2005/0045480 A1 | 3/2005 | Krumme | |
| 2005/0198904 A1 | 9/2005 | Browne et al. | |
| 2005/0206096 A1 | 9/2005 | Browne et al. | |
| 2006/0038745 A1 | 2/2006 | Naksen et al. | |
| 2007/0046074 A1 | 3/2007 | Satta et al. | |
| 2007/0120438 A1 | 5/2007 | Divoux | |
| 2007/0246898 A1 | 10/2007 | Keefe et al. | |
| 2009/0086331 A1 | 4/2009 | Gunasekaran et al. | |
| 2009/0115285 A1 | 5/2009 | Najafi et al. | |
| 2010/0254837 A1 | 10/2010 | Boersma et al. | |
| 2010/0258362 A1 | 10/2010 | Trimmer | |
| 2011/0188258 A1 | 8/2011 | Tajima | |
| 2012/0287493 A1 | 11/2012 | Kuhlman et al. | |
| 2013/0255815 A1 | 10/2013 | Brinkmann et al. | |
| 2013/0304049 A1 | 11/2013 | Behnke, II et al. | |
| 2013/0318962 A1 * | 12/2013 | Joshi | F15B 7/00 |
| | | | 60/545 |
| 2015/0331156 A1 | 11/2015 | Hirsa | |
| 2016/0106620 A1 | 4/2016 | Uno et al. | |
| 2017/0150252 A1 | 5/2017 | Trestain et al. | |
| 2018/0036198 A1 | 2/2018 | Mergl et al. | |
| 2018/0172172 A1 | 6/2018 | Oehler et al. | |
| 2018/0339624 A1 | 11/2018 | Leck | |
| 2019/0023161 A1 | 1/2019 | Sullivan et al. | |
| 2019/0032684 A1 | 1/2019 | Kowalewski et al. | |
| 2019/0059608 A1 | 2/2019 | Yan et al. | |
| 2019/0232822 A1 | 8/2019 | Hintermaier | |
| 2019/0296217 A1 | 9/2019 | Jung et al. | |
| 2020/0032822 A1 | 1/2020 | Keplinger et al. | |
| 2020/0130202 A1 | 4/2020 | Gandhi et al. | |
| 2020/0130321 A1 | 4/2020 | Gandhi et al. | |
| 2020/0132213 A1 | 4/2020 | Gandhi et al. | |
| 2020/0136525 A1 | 4/2020 | Gandhi et al. | |
| 2020/0136526 A1 | 4/2020 | Gandhi et al. | |
| 2020/0156314 A1 | 5/2020 | Rowe et al. | |
| 2020/0182269 A1 | 6/2020 | Rowe | |
| 2020/0189469 A1 | 6/2020 | Gandhi et al. | |
| 2020/0216121 A1 | 7/2020 | Gandhi et al. | |
| 2020/0238854 A1 | 7/2020 | Gandhi et al. | |
| 2020/0259426 A1 | 8/2020 | Rowe | |

FOREIGN PATENT DOCUMENTS

| | | |
|---|---|---|
| WO | 2017077541 A1 | 5/2017 |
| WO | 2018175741 A1 | 9/2018 |

OTHER PUBLICATIONS

Acome et al., "Hydraulically Amplified Self-Healing Electrostatic Actuators with Muscle-Like Performance," Science, vol. 359, Issue 6371, pp. 61-65 (Jan. 5, 2018) (6 pages).

Acome et al., "Hydraulically Amplified Self-Healing Electrostatic Actuators with Muscle-Like Performance," Science, vol. 359, Issue 6371, 61-65 (2018).

Rothemund et al., "A Soft, Bistable Valve for Autonomous Control of Soft Actuators," Science Robotics, vol. 3, Issue 16, eaar7986 (2018).

Follador et al., "Design of a Compact Bistable Mechanism Based on Dielectric Elastomer Actuators," Meccanica, vol. 50, Issue 11, 2741-2749 (2015).

Yatchev et al., "Characteristics of a Bistable Permanent Magnet Linear Actuator with Soil Magnetic Mover," International Journal of Applied Electromagnetics and Mechanics, vol. 27, No. 1, 2, 43-52 (2008).

Yang et al., "Novel Design and Three-Dimensional Printing of Variable Stiffness Robotic Grippers," Dec. 2016, ASME Journal of Mechanisms and Robotics, vol. 8, pp. 061010-1 to 061010-15 (15 pages).

SMC Tech, "Precision Regulator: Series IR1000/2000/3000", SMC Tech, pp. 713-725 and 1-19, 2015 (53 pages).

* cited by examiner

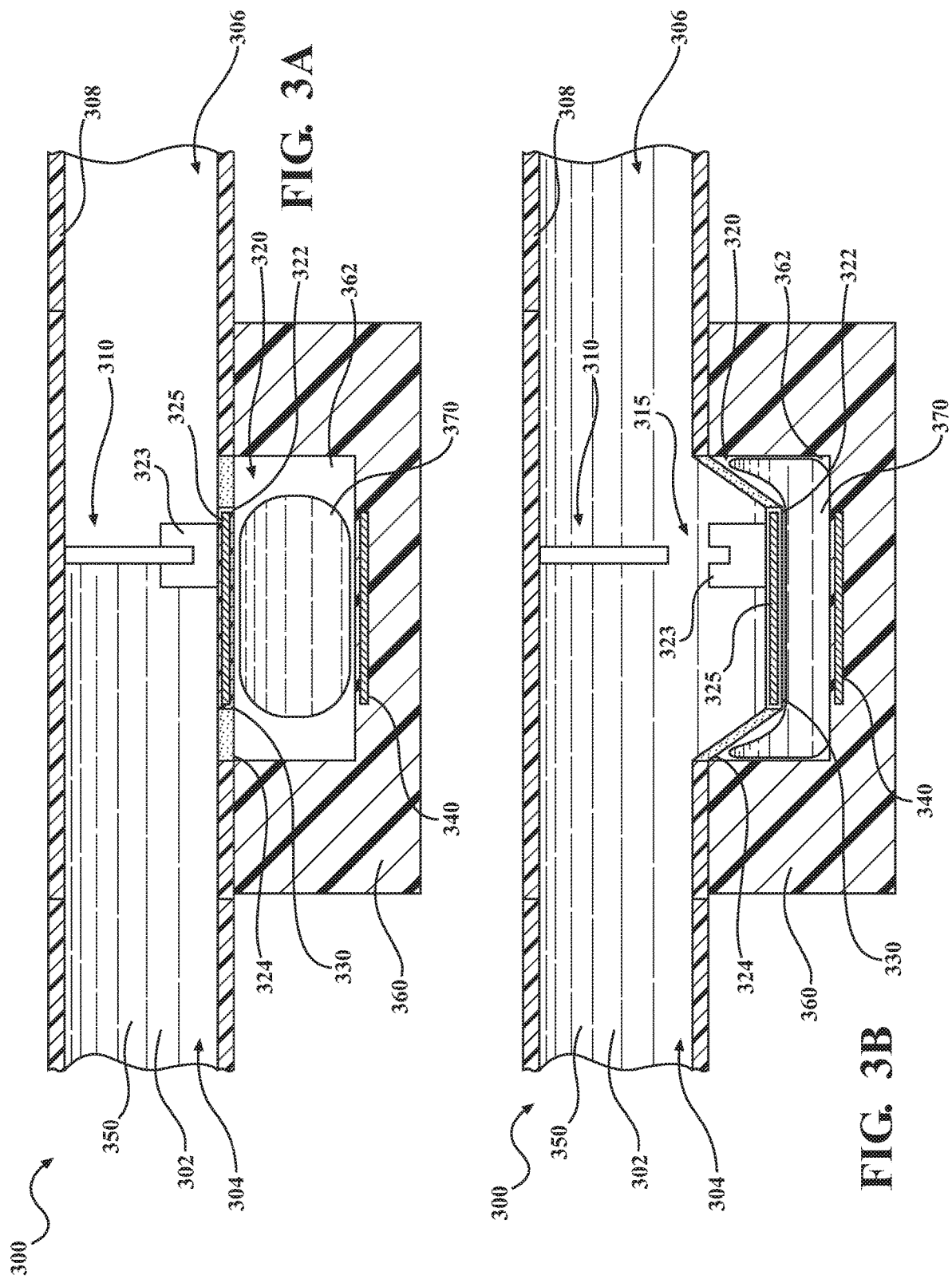

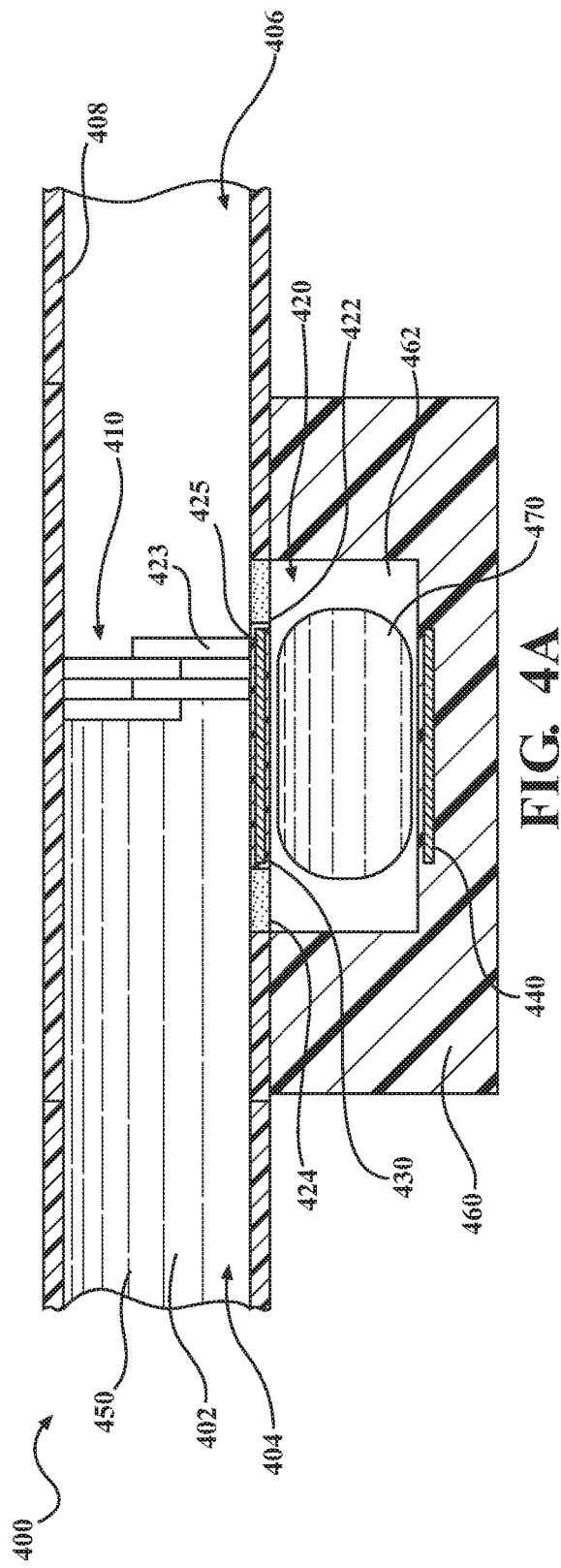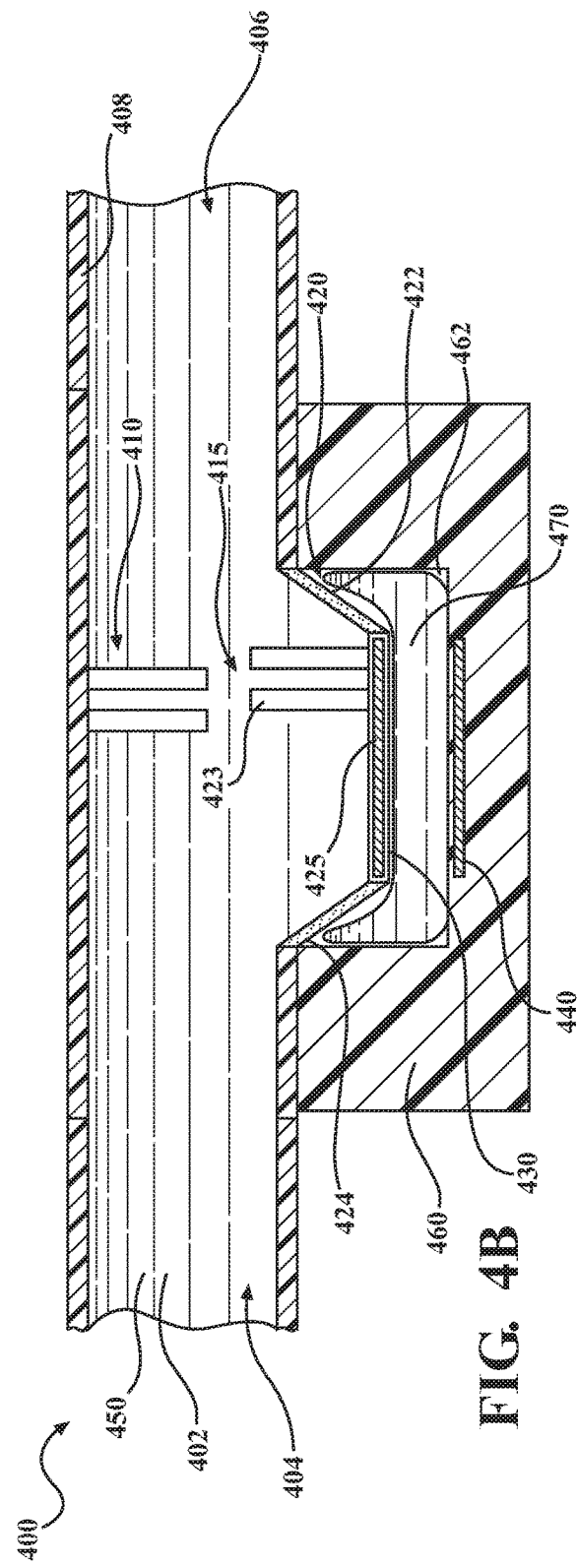

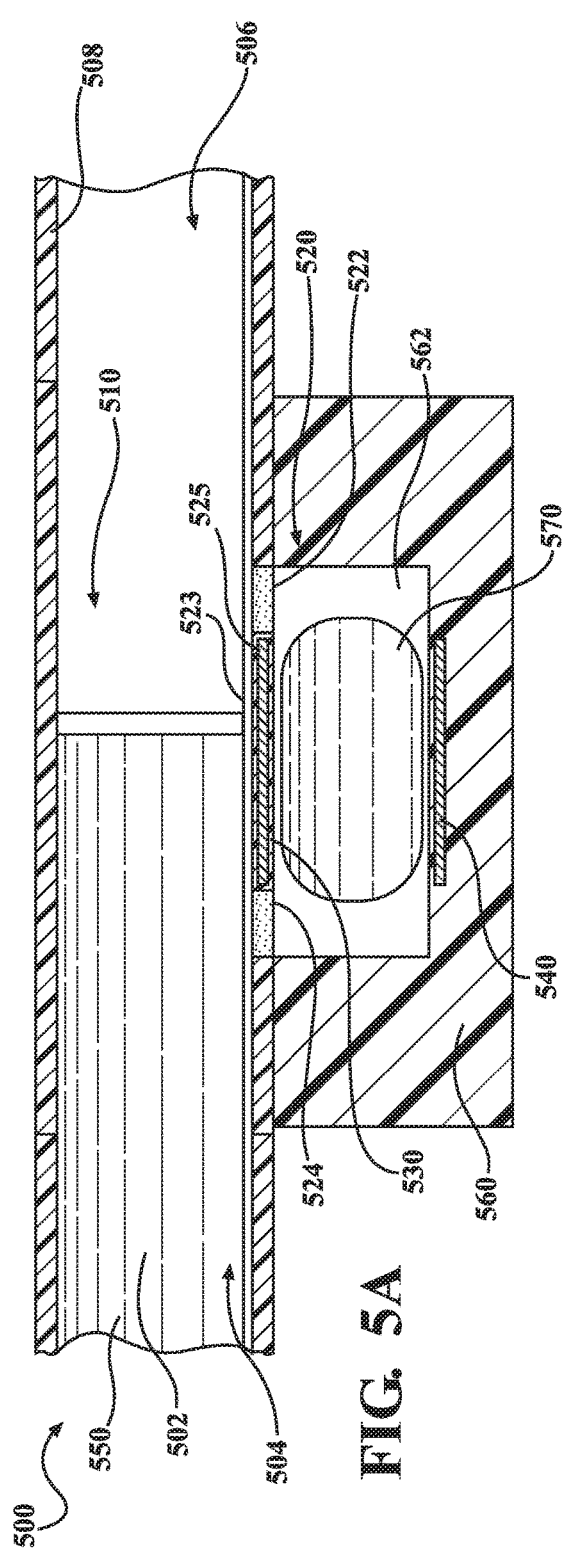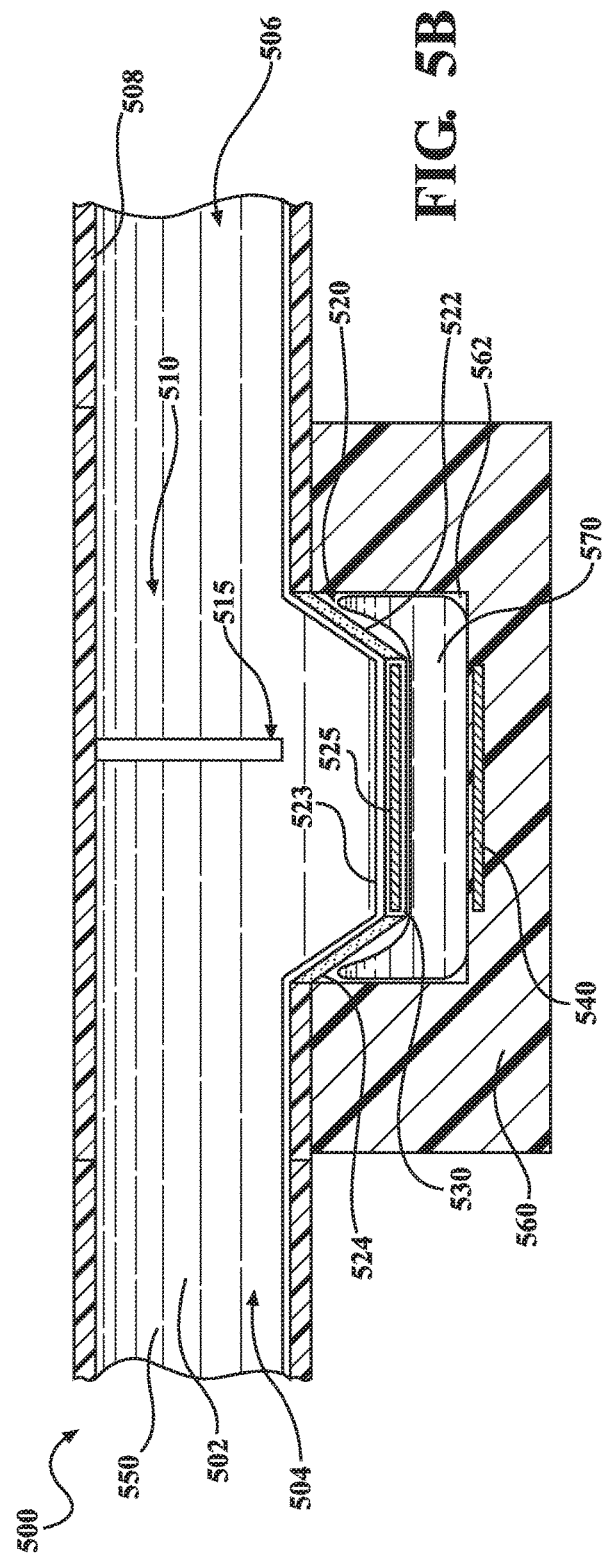

SELF-HEALING MICROVALVE

TECHNICAL FIELD

The subject matter described herein generally relates to valves and, more particularly, microvalves which can return to an original state with no external energy input.

BACKGROUND

Fluid control valves and fluid flow systems are used throughout a vehicle to control the flow of fluids. Examples of fluid flow systems include (a) fuel flow to the combustion chambers or cylinders of an internal combustion engine, (b) water flow to control the cooling of an internal combustion engine, and (c) brake fluid flow to control brake function and stopping power for the vehicle in motion. These fluid flows are typically controlled by fluid control valves, such as solenoid operated valves. Fluid control valves can require an energy input, such as an electrical input, to open and close, creating the fluid-tight reversible seal.

SUMMARY

Disclosed herein is a self-healing microvalve usable to control the flow of one or more fluids. In one or more implementations, a self-healing microvalve is disclosed. The self-healing microvalve can include a valve barrier. The self-healing microvalve can further include a soft hydraulic subassembly, the soft hydraulic subassembly having a fluid-impermeable subassembly membrane. The fluid-impermeable subassembly membrane can include a subassembly insulating portion defining an interior surface and a subassembly compartment defined by the subassembly insulating portion. The subassembly compartment can include a dielectric fluid, a rigid support having a recess, the recess housing a recess conducting surface and the soft hydraulic subassembly, and a valve gate. The valve gate can include a gate conducting surface, the valve gate being positioned in connection with the valve barrier and the soft hydraulic subassembly. The gate conducting surface can be separated from the recess conducting surface by the subassembly compartment.

In another embodiment, a self-healing microvalve is disclosed. The self-healing microvalve can include a valve barrier. The self-healing microvalve can further include a soft hydraulic subassembly, the soft hydraulic subassembly having a fluid-impermeable subassembly membrane. The fluid-impermeable subassembly membrane can include a subassembly insulating portion defining an interior surface, and a subassembly compartment defined by the subassembly insulating portion, the subassembly compartment comprising a dielectric fluid. The fluid-impermeable subassembly membrane can further include a rigid support having a recess, the recess housing a recess conducting surface and the soft hydraulic subassembly. The fluid-impermeable subassembly membrane can further include a valve gate assembly. The valve gate assembly can include a valve gate, an elastic portion connecting the valve gate to the rigid support, a gate conducting surface configured to create an electrostatic attraction to the recess conducting surface in the presence of an electrical input, and a receiving element being positioned to receive the rigid support.

In another embodiment, a self-healing microvalve is disclosed. The self-healing microvalve can include valve barrier positioned in fluid connection with a fluid transport path. The self-healing microvalve can further include a valve gate assembly configured to form a seal with the valve barrier in the absence of an electric input and to separate from the valve barrier when receiving an electric input. The valve gate assembly can include a soft hydraulic subassembly, the soft hydraulic subassembly having a fluid-impermeable subassembly membrane. The fluid-impermeable subassembly membrane can further include a subassembly insulating portion defining an interior surface. The fluid-impermeable subassembly membrane can further include a subassembly compartment defined by the subassembly insulating portion, the subassembly compartment comprising a dielectric fluid. The fluid-impermeable subassembly membrane can further include a rigid support having a recess, the recess housing a recess conducting surface and the soft hydraulic subassembly. The fluid-impermeable subassembly membrane can further include a valve gate comprising an elastomer and a gate conducting surface, the valve gate being positioned over the recess and in connection with the soft hydraulic subassembly, wherein the gate conducting surface is separated from the recess conducting surface by the subassembly compartment.

BRIEF DESCRIPTION OF THE DRAWINGS

So that the manner in which the above recited features of the present disclosure can be understood in detail, a more particular description of the disclosure, briefly summarized above, may be had by reference to the implementations, some of which are illustrated in the appended drawings. It is to be noted, however, that the appended drawings illustrate only typical implementations of this disclosure and are therefore not to be considered limiting of its scope. The disclosure may admit to other equally effective implementations.

FIGS. 3A and 3B are depictions of a series of movements from the self-healing microvalve, according to one or more implementations.

FIGS. 4A and 4B are depictions of a series of movements from the self-healing microvalve, according to further implementations.

FIGS. 5A and 5B are depictions of a series of movements from the self-healing microvalve, according to further implementations.

To facilitate understanding, identical reference numerals have been used, wherever possible, to designate identical elements that are common to the figures. Additionally, elements of one or more implementations may be advantageously adapted for utilization in other implementations described herein.

DETAILED DESCRIPTION

The implementations disclosed herein generally relate to a self-healing microvalve, such as for controlling fluid flow. Self-healing, as used herein, refers to the ability of the microvalve to actuate from a first position to a second position in response to an input, and then, upon removal of the input, return to the first position. The implementations described here are an improvement over the prior art, in that it is a self-healing system that can positively control fluid flow, wherein an electrical input allows fluid to flow. The self-healing microvalve can be used alongside other hydraulic devices or systems, such as to enable a soft hydraulic actuator to maintain an actuated position without further electrical input at the conductive portion. Further, the self-healing microvalves can be used in series to create a plurality of chambers, such that hydraulic force can be delivered to or maintained in specific regions. The self-healing microvalves can include a soft hydraulic subassembly. The soft hydraulic subassembly can include a fluid-impermeable membrane which can contain a dielectric fluid. The soft hydraulic subassembly can rest in a recess, as formed in a rigid support, where the subassembly separated two conductive portions. When the conductive portions receive and electric charge, the self-healing microvalves can open compressing the soft hydraulic subassembly. When the charge is released, the soft hydraulic subassembly can return the self-healing microvalves to a sealed state. The implementations disclosed herein are more clearly described with reference to the figures below.

Figure 1:
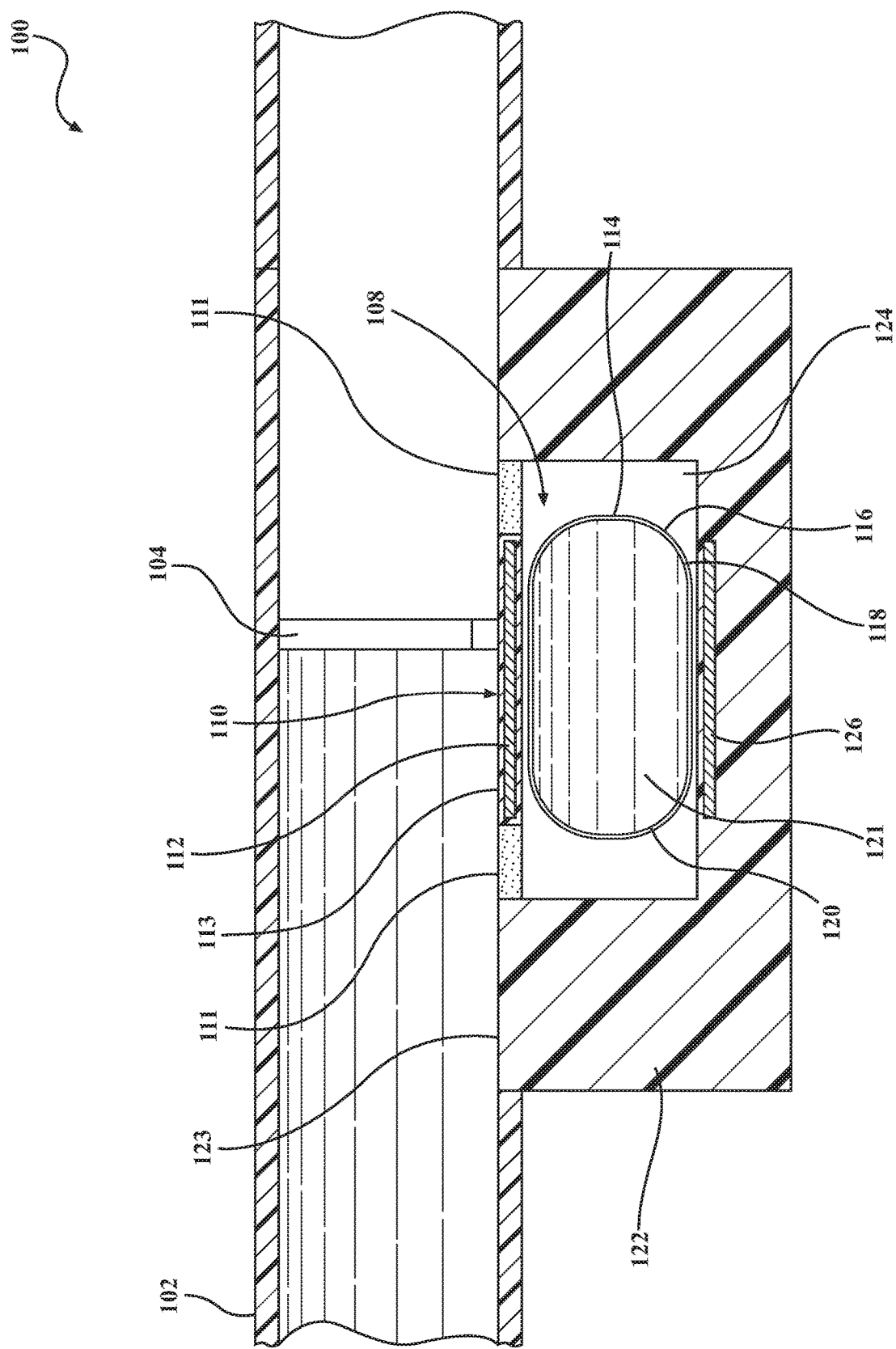
FIG. 1 is a side view of a self-healing microvalve, according to one or more implementations.

FIG. 1 is a side view of a self-healing microvalve 100, according to one or more implementations. The self-healing microvalve 100 can be connected to or with a fluid transport path 102 and can include a valve barrier 104, and a valve gate assembly 108. The valve barrier 104 and the valve gate assembly 108 can be configured to form a fluid-tight seal with the fluid transport path 102. Further, the valve gate assembly 108 can be configured to open in response to an input, such as an electrical input. Thus, the self-healing microvalve 100 can controllably regulate fluid flow in a variety of systems.

The fluid transport path 102 can be a path or route which allows for the controlled delivery of fluids in a system. In one or more implementations, the fluid transport path 102 can be a pipe, tube, or another conduit capable of creating a fluid connection between two locations. In one implementation, the fluid transport path 102 can provide a connection between a fluid reservoir and a vehicle system. The fluid reservoir can be a location capable of storing a fluid for use in a vehicle system, such as fuel, washer fluid, radiator fluid, and others. Vehicle systems as used herein relates to the one or more systems which are involved in the proper function of a vehicle. Vehicle systems can include braking systems, engine systems, fuel delivery systems, and others. The fluid transport path 102 can be composed of a fluid-impermeable substance, such as a metal, an alloy, or a polymer. Further, the fluid transport path 102 can be of a variety of shapes capable of controlling the transport of a fluid.

The valve barrier 104 is a wall, membrane or other at least partially occluding element which acts in conjunction with the valve gate assembly 108 to control fluid flow. The valve barrier 104 can affect fluid movement but, in the absence of the valve gate assembly 108, does not completely prevent fluid flow. The valve barrier 104 can include a rigid or semi-rigid material, such as a metal, a polymer, a ceramic, or others. In some specific examples, the valve barrier 104 can include plastics, aluminum, stainless steel, or combinations thereof. The valve barrier 104 can be of a variety of shapes, such that the valve barrier 104 at least partially seals the fluid transport path 102 at the point of fluid connection. Shown here, the valve barrier 104 can be a substantially flat plate. As used herein, the term "substantially" includes exactly the term it modifies and slight variations therefrom. Thus, the term "substantially flat" means exactly the same and slight variations therefrom. In this particular example, slight variations therefrom can include within normal manufacturing tolerances, within about 10 degrees/percent or less, within about 5 degrees/percent or less, within about 4 degrees/percent or less, within about 3 degrees/percent or less, within about 2 degrees/percent or less, or within about 1 degrees/percent or less.

In one implementation, the valve barrier 104 can include a variety of materials such that the valve barrier 104 can effectively seal with the valve gate assembly 108, such as a combination of a metal and an elastomer. The valve barrier 104 can be positioned in fluid connection with the fluid transport path 102. Fluid connection, as used herein, can include a connection in which two objects interact as part of a fluid path. In this example, the valve barrier 104 can be positioned within the fluid transport path 102, in line with the fluid transport path 102, as part of a second path which receives fluid flow from the fluid transport path 102, or others. In one implementation, the valve barrier 104 is formed into the fluid transport path 102.

The valve gate assembly 108 provides for movement and function in the self-healing microvalve 100. Specifically, the valve gate assembly 108 can include one or more components configured to allow fluid flow in response to an electric input and prevent fluid flow in the absence of said electric input. The valve gate assembly 108 can interact with the valve barrier 104 to create a fluid-tight seal, thus occluding flow through the valve and any fluidly connected elements, such as the fluid transport path 102. The valve gate assembly 108 can include a valve gate 110, a gate conducting surface 112, a soft hydraulic subassembly 114, and a rigid support 122.

The valve gate 110 is a component which connects to the valve barrier 104 to seal the path. The valve gate 110 can be one or more of a variety of shapes such that the valve gate can interact with and effectively seal with the valve barrier 104. In one or more implementations, the valve gate 110 can include a connecting or interacting shape, such as a flat surface and/or a receiving element. "Receiving element," as used herein, refers to one or more objects configured to receive at least a portion of the valve barrier 104. The valve gate 110 can include rigid, malleable, flexible and elastic components, such that the valve gate 110 can deform in one or more directions while maintaining the connecting or interacting shape. In one or more implementations, the valve gate 110 can include an elastic portion 111, the gate conducting surface 112, and a rigid support 113. In the implementation shown here, the gate conducting surface 112 and the rigid support 113 can be a single component, though this implementation is not intended to be limiting.

The elastic portion 111 can be flexible and/or elastic at one or more points. In one or more implementations, the elastic portion 111 is completely flexible and elastic. In another implementation, the elastic portion 111 is flexible across the entirety but only elastic across one or more strips of the fluid-impermeable membranes. One skilled in the art will understand the variety of combinations of flexibility, elasticity, and positioning of the portions of the elastic portion 111, without further explicit recitation of specific examples herein. In another implementation, the elastic portion 111 can have interspersed regions of flexibility, or flexibility and elasticity. The interspersed regions can be in a pattern or random, as desired. The elastic portion 111 can form an interface with the surface of one or more layers or components, such as the gate conducting surface 112 and/or the subassembly membrane 116. "Portion," as used herein, relates to one or more components which form a layer, a portion of a layer, or structure in the valve gate assembly 108.

The elastic portion 111 can include a polymer, an elastomeric polymer (elastomer) or both. The use of a plurality of different encapsulating elastomers and/or polymers of varying degrees of softness and hardness can be employed. The polymers used in the implementations described herein can further include the addition of a plasticizer, such as phthalate esters. The polymers or elastomers may be natural or synthetic. Examples of elastomers usable as part of the elastic portion 111 can include an insulating elastomer, such as nitrile, ethylene propylene diene monomer (EPDM), fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, silicone rubber, or combinations thereof. The term "elastomer," as used herein, means a material which can be stretched by an external force at room temperature to at least twice its original length, and then upon immediate release of the external force, can return to its original length. Room temperature can generally refer to a temperature in a range of from about 20° C. to about 25° C. Elastomers, as used herein, can include a thermoplastic, and can be cross-linked or thermoset.

The gate conducting surface 112 can be conductive to electrical current, such that the conducting portion creates an electric field. The gate conducting surface 112 can be positioned to receive and electric input and create an electric field for creating a movement of the valve gate 110. In one or more implementations, the gate conducting surface 112 can be a conductive material layer formed on, in or in connection with the valve gate 110. In one or more implementations, the gate conducting surface 112 can be connected with the valve gate 110. In one example, the gate conducting surface 112 is formed into the valve gate 110. In another example, the gate conducting surface 112 is formed into the subassembly membrane 116 and the valve gate 110.

The gate conducting surface 112 can include a variety of shapes and compositions. The gate conducting surface 112 can be shaped to substantially match the adjacent component, such as shaped to match the valve gate 110 and/or the soft hydraulic subassembly 114. The gate conducting surface 112 can further include metals, polymers, elastomers, other conductive materials, or combinations thereof. Examples of metals usable as part of the gate conducting surface 112 can include noble metals or corrosion-resistant metals, such as gold, silver, platinum, copper, silver, nickel, aluminum, palladium, titanium, niobium, and tantalum, and others. Examples of elastomers usable as part of the gate conducting surface 112 can include those described above with reference to the elastic portion 111. The gate conducting surface 112 can be composed or further include a conductive material, such as an electrically conductive dopant. Electrically conductive dopants can include metals, such as those listed above, or other conductive species. In further implementations, the gate conducting surface 112 can include inks and adhesives, for the purpose of flexibility and/or conductivity.

The soft hydraulic subassembly 114 can form a support structure for the valve gate 110 by affecting and/or controlling the response of the valve gate 110 to the electrical input and by regulating the self-healing of the soft hydraulic subassembly 114. The soft hydraulic subassembly 114 can include subassembly membrane 116. The subassembly membrane 116 can be a fluid-impermeable membrane. The subassembly membrane 116 can include a subassembly insulating portion 118, which defines a subassembly compartment 120, and a dielectric fluid 121. In some optional implementations, the subassembly membrane 116 can further include the gate conducting surface 112.

The subassembly membrane 116 can be flexible and/or elastic at one or more points, as described above with reference to the elastic portion 111. The subassembly membrane 116 can have interspersed regions of flexibility, or flexibility and elasticity. The interspersed regions can be in a pattern or random, as desired. The subassembly membrane 116 can be a continuous membrane or a combination of membranes. The subassembly membrane 116 can be formed or bound together to define a subassembly compartment 120. The subassembly membrane 116 can form an interface with the surface of one or more layers or components, such as the gate conducting surface 112, the valve gate 110, and/or the rigid support 122. In one implementation, the subassembly membrane 116 is seamlessly connected with the valve gate 110. In another implementation, the subassembly membrane 116 and the valve gate 110 are a single interconnected element.

The subassembly membrane 116 can include a polymer, an elastomer or both. The use of a plurality of different encapsulating elastomers and/or polymers of varying degrees of softness and hardness can be employed. The polymers used in the implementations described herein can further include the addition of a plasticizer, such as phthalate esters. The polymers, elastomers, plasticizers, dopants, or others as used in the subassembly membrane 116 can be substantially similar to the polymers, elastomers, plasticizers, dopants, or others described with reference to the elastic portion 111 above.

The rigid support 122 can be a comparatively rigid component (e.g., non-malleable or semi-malleable) of the self-healing microvalve 100. The rigid support 122 can provide structure and support for the valve gate 110 and the soft hydraulic subassembly 114. The rigid support 122 can be positioned to receive the valve gate 110 and the soft hydraulic subassembly 114 and retain the soft hydraulic subassembly 114 during operation. Further, the rigid support 122 can be configured to apply a counterforce to the valve gate 110 and the soft hydraulic subassembly 114 when the gate conducting surface 112 receives the electrical input. The rigid support 122 can include a support surface 123, a recess 124, and a recess conducting surface 126.

The support surface 123 can be configured to receive one or more components of the self-healing microvalve 100 and/or the fluid transport path 102. The support surface 123 can be of a shape and composition such that the support surface 123 can be resistant to degradation in the presence of the fluids delivered by the fluid transport path 102. In one or more implementations, the support surface 123 can have a low surface roughness. The support surface 123 can be made from one or more rigid and/or corrosion-resistant materials, such as polymers, ceramics, metals, glass, and alloys. In one or more implementations, the support surface 123 can include a crystalline solid, such as device-grade silicon.

The recess 124 can be formed into the support surface 123. The recess 124 can be configured to receive the soft hydraulic subassembly 114. The recess 124 can further have a shape and design such that the soft hydraulic subassembly 114 can be compressed within the recess 124, such as a square or rectangular shape. In one or more implementations, the recess can be sized such that the soft hydraulic subassembly 114 has room for displacement during the activation of the self-healing microvalve 100. In one or more examples, the recess 124 can be greater than about 110% of the volume of the soft hydraulic subassembly 114, such as greater than about 120% of the volume of the soft hydraulic subassembly 114. In one example, the recess 124 is between about 130% and about 150% of the volume of the soft hydraulic subassembly 114. The recess can be of a variety of shapes or combinations of shapes to allow for displacement of the soft hydraulic subassembly 114 when the self-healing microvalve 100 is activated, including all primary shapes as well as combinations thereof.

The recess conducting surface 126 can be positioned in or formed in the recess 124. In one or more implementations, the recess conducting surface 126 can be embedded in the lower surface of the recess 124 and/or formed in the soft hydraulic subassembly 114. The recess conducting surface 126 can be conductive to electrical current, such that the conducting portion creates an electric field. The recess conducting surface 126 can be positioned to receive an electric input and create an electric field for accommodating movement of the valve gate 110. In one or more implementations, the recess conducting surface 126 can be a conductive material layer formed on, in or in connection with the subassembly membrane 116. In one or more implementations, the recess conducting surface 126 can be connected with the subassembly membrane 116. In one example, the recess conducting surface 126 is formed into the subassembly membrane 116. In another example, the recess conducting surface 126 is formed into the recess 124.

The recess conducting surface 126 can include a variety of shapes and compositions. The recess conducting surface 126 can be shaped to substantially match the adjacent component, such as shaped to match the recess 124 and/or the soft hydraulic subassembly 114. The recess conducting surface 126 can further include metals, polymers, elastomers, other conductive materials, or combinations thereof. Examples of metals and elastomers can be substantially similar to those used in combination with the gate conducting surface 112. The recess conducting surface 126 can be composed or further include a conductive material, such as an electrically conductive dopant. Electrically conductive dopants can include metals, such as those listed above, or other conductive species. In further implementations, the recess conducting surface 126 can include inks and adhesives, for the purpose of flexibility and/or conductivity.

The self-healing microvalve 100 provides a variety of benefits in controlling the flow of fluids. In action, when the gate conducting surface 112 and the recess conducting surface 126 of the self-healing microvalve 100 are activated by an electrical input, the gate conducting surface 112 and the recess conducting surface 126 will compress the soft hydraulic subassembly 114 and move the valve gate assembly 108 down. This action opens the self-healing microvalve 100 and allows fluid to move through the fluid transport path 102. Thus a very small electrical input can open the self-healing microvalve 100, allowing the self-healing microvalve 100 to be easily controlled. Further, as the self-healing microvalve 100 can recover the initial position without further input at the speed of elastic recovery for the chosen materials, fluid flow can be controlled in an energy efficient fashion with quick changes in state.

Figure 2A:
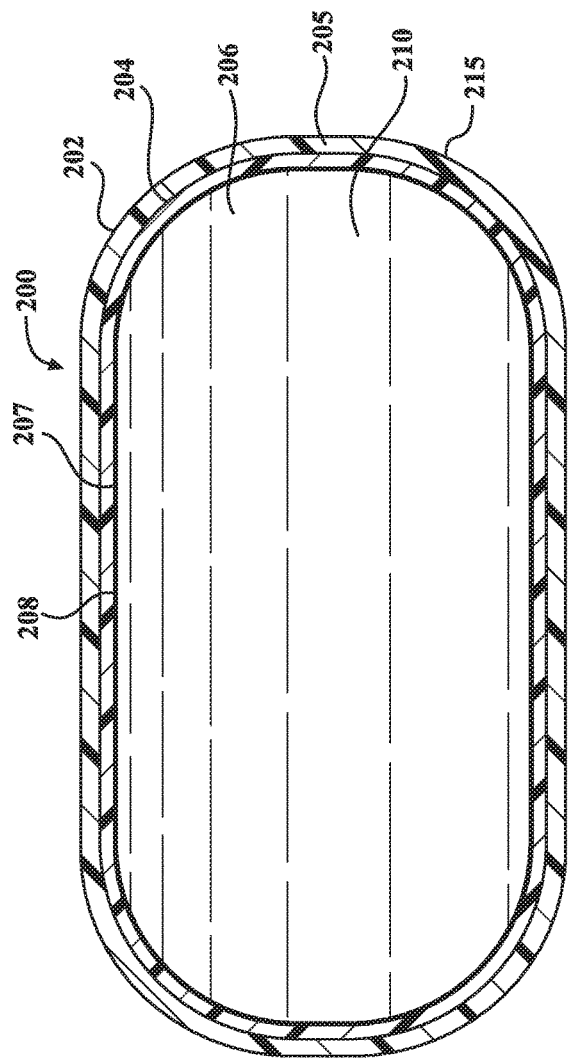
FIGS. 2A and 2B are side views of a soft hydraulic subassembly of the self-healing microvalve, according to one or more implementations.
Figure 2B:
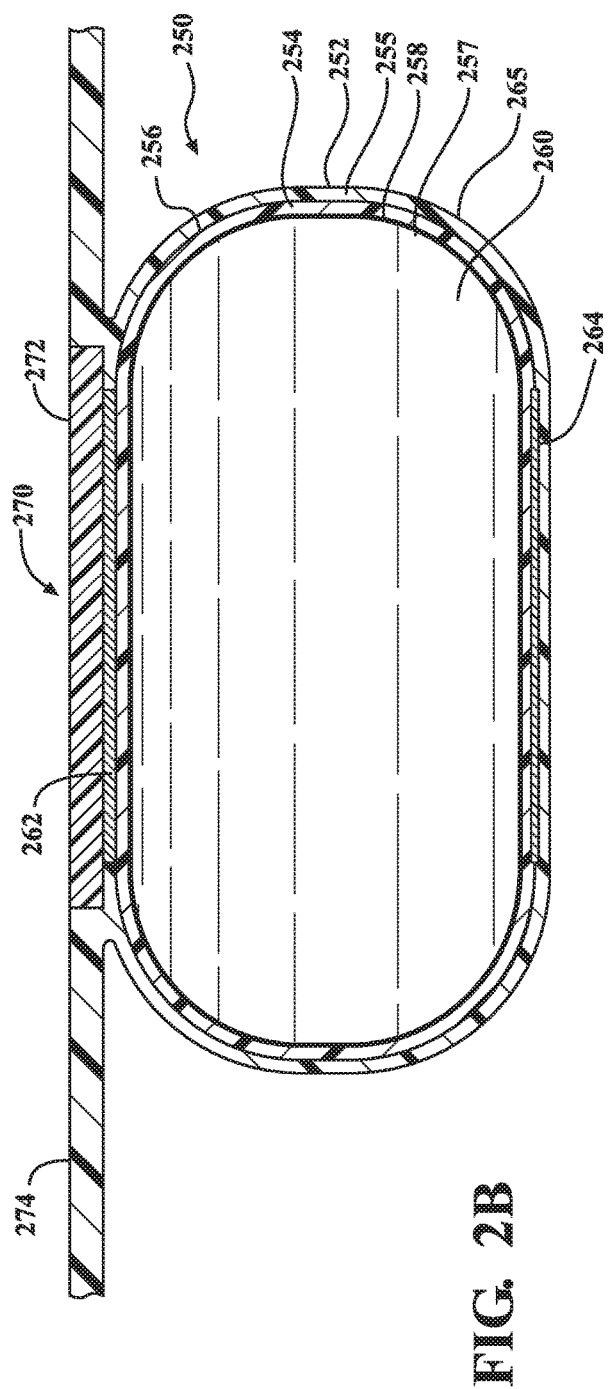

FIGS. 2A and 2B depict side views of a soft hydraulic subassembly, according to one or more implementations. As described above, the soft hydraulic subassembly can be configured to provide back pressure such that the self-healing microvalve can return to an original state after activation. FIG. 2A depicts an implementation of a soft hydraulic subassembly 200, according to one or more implementations. The soft hydraulic subassembly 200 can include a subassembly membrane 202, having at least a subassembly insulation portion 204 and a subassembly exterior portion 205, and a subassembly compartment 206. The subassembly membrane 202 can be composed of one or more layers. The subassembly membrane 202 can further define be composed of a single stack of layers.

The subassembly insulation portion 204 can form an interior surface 207 of the subassembly membrane 202. The subassembly insulation portion 204 can be composed of a material substantially similar to that of the subassembly insulating portion 118, described with reference to FIG. 1. In one or more implementations, the subassembly insulation portion 204 can include an insulating elastomer, such as nitrile, EPDM, fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof. In one or more implementations, the subassembly insulation portion 204 can include polymers and elastomers having a high electric breakdown voltage and not electrically conductive. The subassembly insulation portion 204 can further include a protective layer 208. The protective layer 208 can be formed between the subassembly insulation portion 204 and a dielectric fluid 210. In some arrangements, the protective layer 208 can form at least a part of the interior surface 207. The protective layer 208 can be uniform or vary in size or composition. Further, the protective layer 208 can be non-conductive and/or resistant to corrosion. In one or more implementations, the protective layer 208 is a flexible and corrosion-resistant plastic, such as fluorinated ethylene propylene (FEP).

The subassembly exterior portion 205 can form the exterior surface 215 of the subassembly membrane 202. The subassembly exterior portion 205 can be flexible or malleable, such as being capable of deforming or deflecting without compromising mechanical performance. The subassembly exterior portion 205 can be composed of a material substantially similar to that of the subassembly insulation portion 204. In one or more implementations, the subassembly exterior portion 205 can include polymers and elastomers having a high electric breakdown voltage and not electrically conductive. In further implementations, the subassembly exterior portion 205 can include components which a high resistance to mechanical wear, such as from contact and movement against the recess, described above with reference to FIG. 1.

The subassembly membrane 202 can be sealed at one or more edges, such that the subassembly membrane 202 can form a subassembly compartment 206. The subassembly compartment 206 can hold the dielectric fluid 210. The dielectric fluid 210 can be a fluid that is resistant to electrical breakdown and/or provides insulation. In one or more implementations, the dielectric fluid 210 can prevent arcing between one or more opposing layers (e.g., the gate conducting surface 112 and the recess conducting surface 126). The dielectric fluid 210 can be a lipid based fluid, such as a vegetable oil-based dielectric fluid. In a further implementation, the dielectric fluid 210 can be ethylene glycol. The dielectric fluid 210 can have an associated dielectric constant, or κ value.

FIG. 2B depicts an implementation of a soft hydraulic subassembly 250, according to further implementations. The soft hydraulic subassembly 250 can include a subassembly membrane 252, having subassembly insulation portion 254, and a subassembly compartment 256. The subassembly membrane 252 can be composed of one or more layers. The subassembly membrane 252 can further define be composed of a single stack of layers or a plurality of independent stacks of layers. Shown here, the subassembly membrane 252 is merged with the valve gate assembly 270, such that they act and move as a single unit.

The subassembly insulation portion 254 can form an interior surface 257 of the subassembly membrane 252. The subassembly insulation portion 254 can be composed of a material substantially similar to that of the subassembly insulation portion 204, described with reference to FIG. 2A. In one or more implementations, the subassembly insulation portion 254 can include polymers and elastomers having a high electric breakdown voltage and not electrically conductive. The subassembly insulation portion 254 can further include a protective layer 258. The protective layer 258 can be substantially similar to the protective layer 208, described with reference to FIG. 2A. The subassembly exterior portion 255 can form the exterior surface 265 of the subassembly membrane 252. The subassembly exterior portion 255 can be composed of a material substantially similar to that of the subassembly exterior portion 205, described with reference to FIG. 2A. In one or more implementations, the subassembly exterior portion 255 can include polymers and elastomers having a high electric breakdown voltage and not electrically conductive. In further implementations, the subassembly exterior portion 255 can include components which a high resistance to mechanical wear, such as from contact and movement against the recess, described above with reference to FIG. 1.

The gate conducting surface 262 and the recess conducting surface 264 can be disposed between the subassembly insulation portion 254 and the subassembly exterior portion 255. The gate conducting surface 262 and the recess conducting surface 264 can be substantially similar to the gate conducting surface 112 and the recess conducting surface 126, described with reference to FIG. 1. In one or more embodiments, the gate conducting surface 262 and the recess conducting surface 264 can be substantially flexible, such that the flexible and elastic properties of the subassembly membrane 252 are not affected.

The subassembly membrane 252 can be sealed at one or more edges, such that the subassembly membrane 252 can form a subassembly compartment 256. The subassembly compartment 256 can hold the dielectric fluid 260. The dielectric fluid 260 can be a fluid that is resistant to electrical breakdown and/or provides insulation. In one or more implementations, the dielectric fluid 260 can prevent arcing between the gate conducting surface 262 and the recess conducting surface 264. The dielectric fluid 260 can be a lipid based fluid, such as a vegetable oil-based dielectric fluid. In a further implementation, the dielectric fluid 260 can be ethylene glycol.

The subassembly membrane 252 can further extend to the valve gate assembly 270. The subassembly membrane 252 can extend to one or more components of the valve gate assembly 270, such as the valve gate 272 or the elastic portion 274. Shown here, the subassembly membrane 252 extends to or is merged with both of the valve gate 272 and the elastic portion 274. The valve gate 272 can be substantially more rigid than the subassembly membrane 252, such that a seal may be formed with a valve barrier, such as the valve barrier 104 described with reference to FIG. 1. The elastic portion 274 can be substantially similar to the subassembly membrane 252 and form a connection with one or more secondary surfaces, such as the rigid support 122, described with reference to FIG. 1.

FIGS. 3A and 3B are exemplary illustrations of a self-healing microvalve 300, according to one or more implementations. The self-healing microvalve 300 is depicted here as a unit, including a cut-away portion of a valve barrier 310 and a valve gate assembly 320. The valve barrier 310 can be a continuous element extending from one or more surfaces. As such, the valve barrier 310 can be used in conjunction with the valve gate assembly 320 to form the self-healing microvalve 300. The formation, composition and other features of the valve barrier 310 and the valve gate assembly 320 can be substantially similar to the valve barrier and the valve gate assembly described with reference to FIGS. 1-2B. The valve gate assembly 320 can further be connected with one or more gate conductive surfaces 330 and one or more recess conductive surfaces 340. The one or more gate conductive surfaces 330 and the one or more recess conductive surfaces 340 can be substantially similar to the gate conducting surface and/or the recess conducting surface, described with reference to FIGS. 1-2B. The valve barrier 310 can form one or more openings 315. The openings 315 can be configured to allow a fluid 302 to controllably move between a transmission region 304 and a destination region 306, as delivered by a fluid transport path 350.

The valve barrier 310 can be of a shape and material which is capable of and configured to interact with the valve gate assembly 320 to control fluid flow between the transmission region 304 and the destination region 306. The valve barrier 310 can be of a variety of shapes and size, such as all primary shapes or combinations thereof. Further, the valve barrier can be shaped to match interior walls 308 of the transmission region 304 and/or the destination region 306. The valve barrier 310 is shown here as a side view. The valve barrier 310 can have a rectangular profile and is attached to the interior walls such as to create an opening 315 toward the valve gate assembly 320. The valve barrier 310 can be positioned to receive the valve gate assembly 320 and/or components thereof.

In one or more implementations, the valve gate assembly 320 can include a valve gate 322, a receiving element 323, and an elastic portion 324. The valve gate assembly 320 can act in conjunction with the valve barrier 310 to block or occlude the opening 315. Shown here, the valve gate 322 and the elastic portion 324 can hold the receiving element 323 in contact with the valve barrier 310 to form the seal. The connecting design of the valve gate assembly 320 can include material properties such that the openings 315 are substantially covered and/or occluded. The material properties can include shape and dimensions, material composition, and others. The material composition can include one or more material types and/or combinations of materials. In one implementation, the valve gate assembly 320 can include metals, polymers, or others, such as described above with reference to FIGS. 1-2B.

The receiving element 323 can have or include a variety of dimensions and form one or more shapes or combinations of shapes. Specifically referring to the receiving element 323, possible shapes can include all primary shapes or combinations thereof, such that the receiving element 323 is capable of forming a seal with the valve barrier 310. In this example, the receiving element 323 is generally square-shaped with a valve barrier-shaped recess formed therein. The receiving element 323 can have a length and width which is substantially equal. In further implementations, the valve gate assembly 320 can be triangular, circular, hexagonal, or others. Though the sides are depicted as being equal, the receiving element 323 can have different lengths and widths. The receiving element 323 can have a high ratio of length and/or width to height, where a high ratio refers to the length and/or width being greater than the height. In one example, the length and/or width to height is 10:1, such as 30:1. The receiving element 323 can have dimensions which accommodate the functions described above.

The valve gate 322 and the elastic portion 324 can be substantially similar to the gate conducting surface 112 and the elastic portion 111, described with reference to FIG. 1. The valve gate 322 can be a substantially horizontal element, with respect to the flow direction of the self-healing microvalve 300. The elastic portion 324 can have an elasticity which accommodates the movement of the valve gate assembly 320, both in the active and inactive position, while avoiding mechanical failure. Shown here, the valve gate 322, housing a gate conducting surface 330, and the elastic portion 324 form a portion of the wall or path for the fluid flow. In some embodiments, the valve gate 322 and the elastic portion 324 are fluid-impermeable and/or electrically isolated from fluids or other components which are in contact with said fluids, such as the fluid transport path 350.

The valve gate assembly 320 can be in connection with a rigid support 360. The rigid support 360 can include a recess 362. The rigid support 360 and the recess 362 can be substantially similar to the rigid support and the recess described with reference to FIGS. 1-2B. The rigid support 360 can support one or more elements of the valve gate assembly 320, such as the valve gate 322, the elastic portion 324, a soft hydraulic subassembly 370, and the receiving element 323.

In operation, the valve gate assembly 320 can regulate and/or control fluidic communication between the transmission region 304 and the destination region 306. When the valve gate assembly 320 is in a passive state (e.g., not receiving an electric current), the self-healing microvalve 300 can restrict the flow of the fluid 302 through the opening 315 and into the destination region 306. As shown in FIG. 3A, the gate conducting surface 330 and the recess conducting surface 340 are not receiving an electric input and thus are in the passive state. In the passive state, the valve gate 322 and the elastic portion 324 are relaxed, and the receiving element 323 is connected to the valve barrier 310. As such, the fluid 302 cannot travel from the transmission region 304 to the destination region 306, as delivered by a fluid transport path 350.

When the valve gate assembly 320 is in an active state (e.g., receiving an electric current), the valve gate assembly 320 can move to a second position which no longer blocks return flow of the fluid 302. As shown in FIG. 3B, when the valve gate assembly 320 receives an electric charge, such as through the gate conducting surface 330 and the recess conducting surface 340, the gate conducting surface 330 and the recess conducting surface 340 can create an electrostatic attraction and compress together. The soft hydraulic subassembly 370 can then be compressed by the valve gate 322 and the elastic portion 324 into the recess 362 of the rigid support 360. Thus, the valve gate assembly 320 can move out and away from the valve barrier 310. This movement of the valve gate assembly 320 can allow the fluid 302 to flow through the opening 315. As such, the fluid 302 can equilibrate between the transmission region 304 and the destination region 306. The properties of movement for the valve gate assembly 320 can be controlled as desired, including the range and direction of movement, the force of movement, and other facets of the change in position, in accordance with implementations described herein.

Thus, the self-healing microvalve 300 can control the flow of fluids from either the transmission region 304 or the destination region 306 with minimal energy input. When in a passive state, the valve gate assembly 320 can be in connection with the valve barrier 310, blocking the passage. Thus, the self-healing microvalve in the passive state can prevent the free flow of fluid between the transmission region 304 and the destination region 306. When in an active state, the valve gate assembly 320 can be mechanically separated from the valve barrier 310. Thus, the self-healing microvalve 300 in the active state can allow free flow of fluid between the transmission region 304 and the destination region 306. Thus, the self-healing microvalve 300 can be actuated only when the flow is desired to control fluid flow between the transmission region 304 and the destination region 306.

FIGS. 4A and 4B are exemplary illustrations of a self-healing microvalve 400, according to further implementations. The self-healing microvalve 400 is depicted here as a unit, including a cut-away portion of a valve barrier 410 and a valve gate assembly 420. The valve barrier 410 can be a continuous element extending from one or more surfaces. As such, the valve barrier 410 can be used in conjunction with the valve gate assembly 420 to form the self-healing microvalve 400. The formation, composition and other features of the valve barrier 410 and the valve gate assembly 420 can be substantially similar to the valve barrier and the valve gate assembly described with reference to FIGS. 1-2B. The valve gate assembly 420 can further be connected with one or more gate conductive surfaces 430 and one or more recess conductive surfaces 440. The one or more gate conductive surfaces 430 and the one or more recess conductive surfaces 440 can be substantially similar to the gate conducting surface and/or the recess conducting surface, described with reference to FIGS. 1-2B. The valve barrier 410 can form one or more openings 415. The openings 415 can be configured to allow a fluid 402 to controllably move between a transmission region 404 and a destination region 406, as delivered by a fluid transport path 450.

The valve barrier 410 can be of a shape and material which is capable of and configured to interact with the valve gate assembly 420 to control fluid flow between the transmission region 404 and the destination region 406. The valve barrier 410 can be of a variety of shapes and size, such as all primary shapes or combinations thereof. Further, the valve barrier can be shaped to match interior walls 408 of the transmission region 404 and/or the destination region 406. As shown in FIGS. 4A and 4B, the valve barrier 410 can be a combination of two rectangular profiles positioned in parallel and is attached to the interior walls such as to create an opening 415 toward the valve gate assembly 420. The valve barrier 410 can be positioned to receive the valve gate assembly 420 and/or components thereof.

In one or more implementations, the valve gate assembly 420 can include a valve gate 422, a receiving element 423, and an elastic portion 424. The valve gate assembly 420 can act in conjunction with the valve barrier 410 to block or occlude the opening 415. Shown here, the valve gate 422 and the elastic portion 424 can hold the receiving element 423 in contact with the valve barrier 410 to form the seal. The connecting design of the valve gate assembly 420 can include material properties such that the openings 415 are substantially covered and/or occluded. The material properties can include shape and dimensions, material composition, and others. The material composition can include one or more material types and/or combinations of materials. The valve gate 422 and the elastic portion 424 can be substantially similar to the valve gate 322 and the elastic portion 324, described with reference to FIGS. 3A and 3B. In one implementation, the valve gate assembly 420 can include metals, polymers, or others, such as described above with reference to FIGS. 1-2B.

The receiving element 423 can have or include a variety of dimensions and form one or more shapes or combinations of shapes. Specifically referring to the receiving element 423, possible shapes can include all primary shapes or combinations thereof, such that the receiving element 423 is capable of forming a seal with the valve barrier 410. In this example, the receiving element 423 is a pair of alternating rectangular bodies positioned to create an interconnecting region therein. The receiving element 423 can have a length and width which is substantially equal. In further implementations, the valve gate assembly 420 can be triangular, circular, hexagonal, or others, including multiples and/or combinations thereof. Though the sides are depicted as being equal, the components of the receiving element 423 can have different lengths and widths. The receiving element 423 can have a high ratio of length and/or width to height, where a high ratio refers to the length and/or width being greater than the height. The receiving element 423 can have dimensions which accommodate the functions described above.

The valve gate assembly 420 can be in connection with a rigid support 460. The rigid support 460 can include a recess 462. The rigid support 460 and the recess 462 can be substantially similar to the rigid support and the recess described with reference to FIGS. 1-2B. The rigid support 460 can support one or more elements of the valve gate assembly 420, such as the valve gate 422, the elastic portion 424, a soft hydraulic subassembly 470, and the receiving element 423.

In operation, the valve gate assembly 420 can regulate and/or control fluidic communication between the transmission region 404 and the destination region 406. When the valve gate assembly 420 is in a passive state (e.g., not receiving an electric current), the self-healing microvalve 400 can restrict the flow of the fluid 402 through the opening 415 and into the destination region 406. As shown in FIG. 4A, the gate conducting surface 430 and the recess conducting surface 440 are not receiving an electric input and thus are in the passive state. In the passive state, the valve gate 422 and the elastic portion 424 are relaxed, and the receiving element 423 can be interlocked with the valve barrier 410. As such, the fluid 402 cannot travel from the transmission region 404 to the destination region 406, as delivered by the fluid transport path 450.

When the valve gate assembly 420 is in an active state (e.g., receiving an electric current), the valve gate assembly 420 can move to a second position which no longer blocks return flow of the fluid 402. As shown in FIG. 4B, when the valve gate assembly 420 receives an electric charge, such as through the gate conductive surface 430 and the recess conductive surface 440, the gate conductive surface 430 and the recess conductive surface 440 can create an electrostatic attraction and compress together. The soft hydraulic subassembly 470 can then be compressed by the valve gate 422 and the elastic portion 424 into the recess 462 of the rigid support 460. Thus, the valve gate assembly 420 can move out and away from the valve barrier 410, which separates the interlocking components of the valve barrier 410 and the receiving element 423. This movement of the valve gate assembly 420 can allow the fluid 402 to flow through the opening 415. As such, the fluid 402 can equilibrate between the transmission region 404 and the destination region 406. The properties of movement for the valve gate assembly 420 can be controlled as desired, including the range and direction of movement, the force of movement, and other facets of the change in position, in accordance with implementations described herein.

Thus, the self-healing microvalve 400 can control the flow of fluids from either the transmission region 404 or the destination region 406 with minimal energy input. When in a passive state, the valve gate assembly 420 can be in connection with the valve barrier 410, blocking the passage. Thus, the self-healing microvalve in the passive state can prevent the free flow of fluid between the transmission region 404 and the destination region 406. When in an active state, the valve gate assembly 420 can be mechanically separated from the valve barrier 410. Thus, the self-healing microvalve 400 in the active state can allow free flow of fluid between the transmission region 404 and the destination region 406. Thus, the self-healing microvalve 400 can be actuated only when the flow is desired to control fluid flow between the transmission region 404 and the destination region 406.

FIGS. 5A and 5B are exemplary illustrations of a self-healing microvalve 500, according to further implementations. The self-healing microvalve 500 is depicted here as a unit, including a cut-away portion of a valve barrier 510 and a valve gate assembly 520. The valve barrier 510 can be a continuous element extending from one or more surfaces. As such, the valve barrier 510 can be used in conjunction with the valve gate assembly 520 to form the self-healing microvalve 500. The formation, composition and other features of the valve barrier 510 and the valve gate assembly 520 can be substantially similar to the valve barrier and the valve gate assembly described with reference to FIGS. 1-2B. The valve gate assembly 520 can further be connected with one or more gate conductive surfaces 530 and one or more recess conductive surfaces 540. The one or more gate conductive surfaces 530 and the one or more recess conductive surfaces 540 can be substantially similar to the gate conducting surface and/or the recess conducting surface, described with reference to FIGS. 1-2B. The valve barrier 510 can form one or more openings 515. The openings 515 can be configured to allow a fluid 502 to controllably move between a transmission region 504 and a destination region 506, as delivered by a fluid transport path 550.

The valve barrier 510 can be of a shape and material which is capable of and configured to interact with the valve gate assembly 520 to control fluid flow between the transmission region 504 and the destination region 506. The valve barrier 510 can be of a variety of shapes and size, such as all primary shapes or combinations thereof. Further, the valve barrier can be shaped to match interior walls 508 of the transmission region 504 and/or the destination region 506. As shown in FIGS. 5A and 5B, the valve barrier 510 is a rectangular profile extending the width of the interior wall 508 and is attached to the interior walls 508 such as to create an opening 515 toward the valve gate assembly 520 when in the relaxed position. The valve barrier 510 can be positioned to receive the valve gate assembly 520 and/or components thereof.

In one or more implementations, the valve gate assembly 520 can include a valve gate 522, a receiving element 523, and an elastic portion 524. The valve gate assembly 520 can act in conjunction with the valve barrier 510 to block or occlude the opening 515. Shown here, the valve gate 522 and the elastic portion 524 can hold the receiving element 523 in contact with the valve barrier 510 to form the seal. The connecting design of the valve gate assembly 520 can include material properties such that the openings 515 are substantially covered and/or occluded. The material properties can include shape and dimensions, material composition, and others. The material composition can include one or more material types and/or combinations of materials. The valve gate 522 and the elastic portion 524 can be substantially similar to the valve gate 322 and the elastic portion 324, described with reference to FIGS. 3A and 3B. In one implementation, the valve gate assembly 520 can include metals, polymers, or others, such as described above with reference to FIGS. 1-2B.

The receiving element 523 can have or include a variety of dimensions and form one or more shapes or combinations of shapes. Specifically referring to the receiving element 523, possible shapes can include all primary shapes or combinations thereof, such that the receiving element 523 is capable of forming a seal with the valve barrier 510. In this example, the receiving element 523 is a compressible layer positioned on the surface of the valve gate assembly 520. The receiving element 523 can have a length and width which is longer or shorter than depicted here. In further implementations, the valve gate assembly 520 can be have a thickness which increases or decreases along the surface. Though the thickness is depicted as being equal, the receiving element 523 can have different lengths and widths. Further, the receiving element 523 can have dimensions which accommodate the functions described above.

The valve gate assembly 520 can be in connection with a rigid support 560. The rigid support 560 can include a recess 562. The rigid support 560 and the recess 562 can be substantially similar to the rigid support and the recess described with reference to FIGS. 1-2B. The rigid support 560 can support one or more elements of the valve gate assembly 520, such as the valve gate 522, the elastic portion 524, a soft hydraulic subassembly 570, and the receiving element 523.

In operation, the valve gate assembly 520 can regulate and/or control fluidic communication between the transmission region 504 and the destination region 506. When the valve gate assembly 520 is in a passive state (e.g., not receiving an electric current), the self-healing microvalve 500 can restrict the flow of the fluid 502 through the opening 515 and into the destination region 506. As shown in FIG. 5A, the gate conducting surface 530 and the recess conducting surface 540 are not receiving an electric input and thus are in the passive state. In the passive state, the valve gate 522 and the elastic portion 524 are relaxed, and the receiving element 523 can be sealed against with the valve barrier 510. As such, the fluid 502 cannot travel from the transmission region 504 to the destination region 506, as delivered by the fluid transport path 550.

When the valve gate assembly 520 is in an active state (e.g., receiving an electric current), the valve gate assembly 520 can move to a second position which no longer blocks return flow of the fluid 502. As shown in FIG. 5B, when the valve gate assembly 520 receives an electric charge, such as through the gate conductive surface 530 and the recess conductive surface 540, the gate conductive surface 530 and the recess conductive surface 540 can create an electrostatic attraction and compress together. The soft hydraulic subassembly 570 can then be compressed by the valve gate 522 and the elastic portion 524 into the recess 562 of the rigid support 560. Thus, the valve gate assembly 520 can move out and away from the valve barrier 510, which separates the valve barrier 510 and the receiving element 523. This movement of the valve gate assembly 520 can allow the fluid 502 to flow through the opening 515. As such, the fluid 502 can equilibrate between the transmission region 504 and the destination region 506. The properties of movement for the valve gate assembly 520 can be controlled as desired, including the range and direction of movement, the force of movement, and other facets of the change in position, in accordance with implementations described herein.

Thus, the self-healing microvalve 500 can control the flow of fluids from either the transmission region 504 or the destination region 506 with minimal energy input. When in a passive state, the valve gate assembly 520 can be in connection with the valve barrier 510, blocking the passage. Thus, the self-healing microvalve in the passive state can prevent the free flow of fluid between the transmission region 504 and the destination region 506. When in an active state, the valve gate assembly 520 can be mechanically separated from the valve barrier 510. Thus, the self-healing microvalve 500 in the active state can allow free flow of fluid between the transmission region 504 and the destination region 506. Thus, the self-healing microvalve 500 can be actuated only when the flow is desired to control fluid flow between the transmission region 504 and the destination region 506.

Figure 6A:
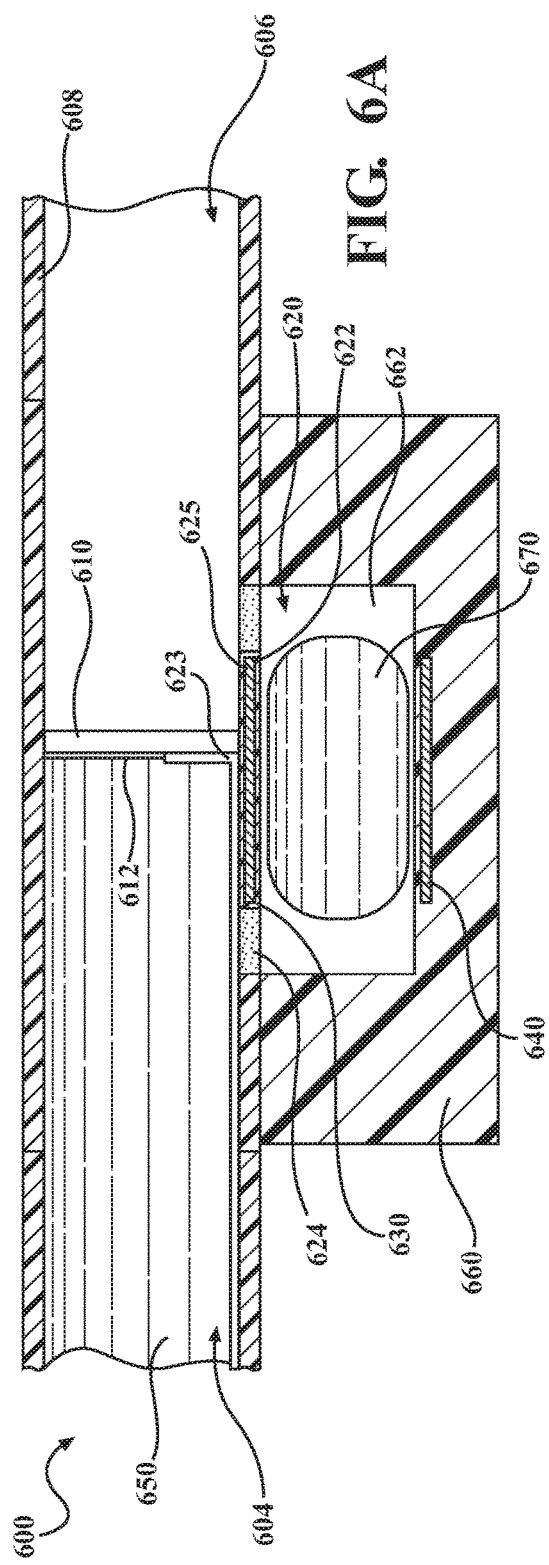
FIGS. 6A and 6B are depictions of a series of movements from the self-healing microvalve, according to further implementations.
Figure 6B:
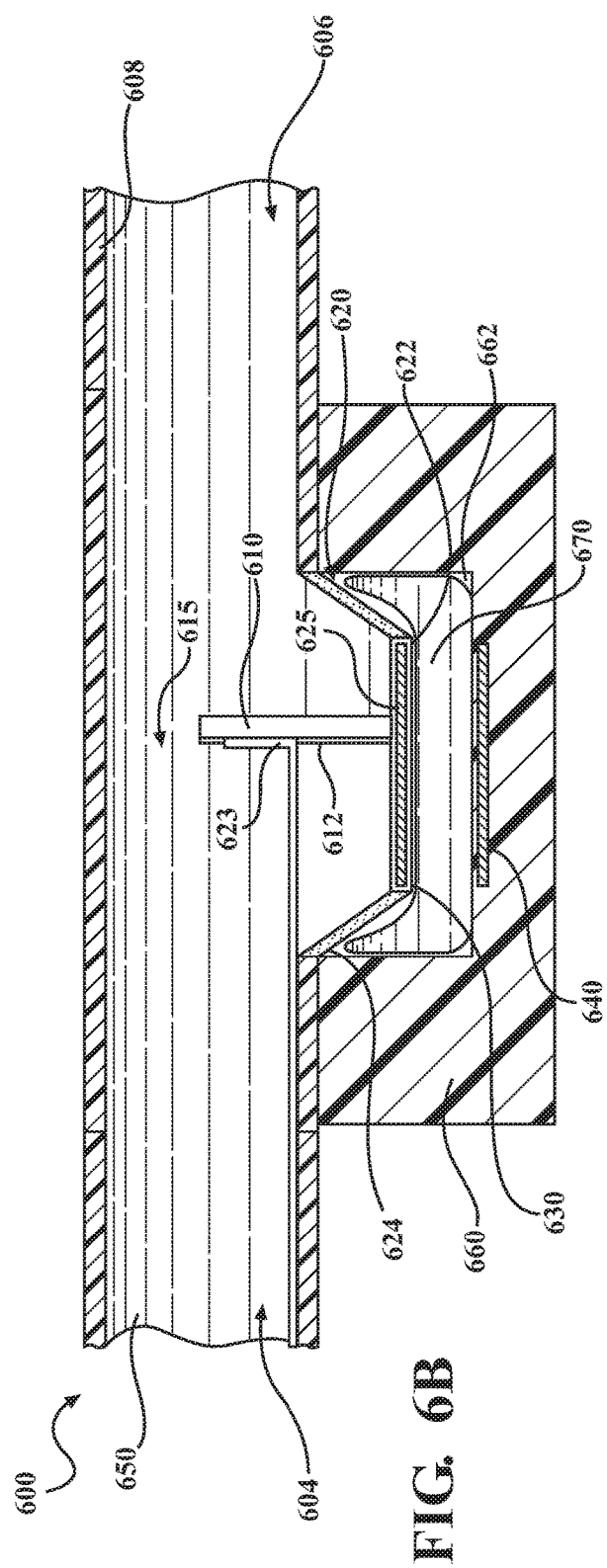

FIGS. 6A and 6B are exemplary illustrations of a self-healing microvalve 600, according to further implementations. The self-healing microvalve 600 is depicted here as a unit, including a cut-away portion of a valve barrier 610 and a valve gate assembly 620. The valve barrier 610 can be a continuous element extending from one or more surfaces. The valve barrier 610 is shown here as extending from the valve gate assembly 620. As such, the valve barrier 610 can be used in conjunction with the valve gate assembly 620 to form the self-healing microvalve 600. The formation, composition and other features of the valve barrier 610 and the valve gate assembly 620 can be substantially similar to the valve barrier and the valve gate assembly described with reference to FIGS. 1-2B. The valve gate assembly 620 can further be connected with one or more gate conductive surfaces 630 and one or more recess conductive surfaces 640. The one or more gate conductive surfaces 630 and the one or more recess conductive surfaces 640 can be substantially similar to the gate conducting surface and/or the recess conducting surface, described with reference to FIGS. 1-2B. The valve barrier 610 can form one or more openings 615. The openings 615 can be configured to allow a fluid 602 to controllably move between a transmission region 604 and a destination region 606, as delivered by a fluid transport path 650.

The valve barrier 610 can be of a shape and material which is capable of and configured to interact with the valve gate assembly 620 to control fluid flow between the transmission region 604 and the destination region 606. The valve barrier 610 can be of a variety of shapes and size, such as all primary shapes or combinations thereof. Further, the valve barrier can be shaped to match interior walls 608 of the transmission region 604 and/or the destination region 606. As shown in FIGS. 6A and 6B, the valve barrier 610 can have a rectangular profile and is attached to the interior walls such as to create an opening 615 toward the valve gate assembly 620. The valve barrier 610 further includes a rail 612. The rail 612 is received by the receiving element 623, to guide the valve barrier 610 during movement.

In one or more implementations, the valve gate assembly 620 can include a valve gate 622, a receiving element 623, and an elastic portion 624. The valve gate assembly 620 can act in conjunction with the valve barrier 610 to block or occlude the opening 615. Shown here, the valve gate 622 and the elastic portion 624 can be positioned under the receiving element 623 in contact with the valve barrier 610 to form the seal. In this configuration, the seal is formed by the valve gate assembly 620 pressing the valve barrier 610 against the interior wall 608. The connecting design of the valve gate assembly 620 can include material properties such that the openings 615 are substantially covered and/or occluded. The material properties can include shape and dimensions, material composition, and others. The material composition can include one or more material types and/or combinations of materials. The valve gate 622 and the elastic portion 624 can be substantially similar to the valve gate 322 and the elastic portion 324, described with reference to FIGS. 3A and 3B. In one implementation, the valve gate assembly 620 can include metals, polymers, or others, such as described above with reference to FIGS. 1-2B.

The receiving element 623 can have or include a variety of dimensions and form one or more shapes or combinations of shapes. Specifically referring to the receiving element 623, possible shapes can include all primary shapes or combinations thereof, such that the receiving element 623 is capable of forming a seal with the valve barrier 610. In this example, the receiving element 623 is a rectangular body with the rail 612 formed therein, positioned to control the movement of the valve barrier 610. The receiving element 623 can have a length and width which is substantially equal. In further implementations, the valve gate assembly 620 can be triangular, circular, hexagonal, or others, including multiples and/or combinations thereof. Though the sides are depicted as being equal, the components of the receiving element 623 can have different lengths and widths. The receiving element 623 can have dimensions which accommodate the functions described above.

The valve gate assembly 620 can be in connection with a rigid support 660. The rigid support 660 can include a recess 662. The rigid support 660 and the recess 662 can be substantially similar to the rigid support and the recess described with reference to FIGS. 1-2B. The rigid support 660 can support one or more elements of the valve gate assembly 620, such as the valve gate 622, the elastic portion 624, a soft hydraulic subassembly 670, and the receiving element 623.

In operation, the valve gate assembly 620 can regulate and/or control fluidic communication between the transmission region 604 and the destination region 606. When the valve gate assembly 620 is in a passive state (e.g., not receiving an electric current), the self-healing microvalve 600 can restrict the flow of the fluid 602 through the opening 615 and into the destination region 606. As shown in FIG. 6A, the gate conducting surface 630 and the recess conducting surface 640 are not receiving an electric input and thus are in the passive state. In the passive state, the valve gate 622 and the elastic portion 624 are relaxed, the receiving element 623 can be interlocked with the valve barrier 610, and the valve gate 622 can press the valve barrier 610 against the interior wall 608 to form a seal. As such, the fluid 602 cannot travel from the transmission region 604 to the destination region 606, as delivered by the fluid transport path 650.

When the valve gate assembly 620 is in an active state (e.g., receiving an electric current), the valve gate assembly 620 can move to a second position which no longer blocks return flow of the fluid 602. As shown in FIG. 6B, when the valve gate assembly 620 receives an electric charge, such as through the gate conductive surface 630 and the recess conductive surface 640, the gate conductive surface 630 and the recess conductive surface 640 can create an electrostatic attraction and compress together. The soft hydraulic subassembly 670 can then be compressed by the valve gate 622 and the elastic portion 624 into the recess 662 of the rigid support 660. Thus, the valve gate assembly 620 can move the valve barrier 610 away from the interior wall 608. This movement of the valve gate assembly 620 can allow the fluid 602 to flow through the opening 615. As such, the fluid 602 can equilibrate between the transmission region 604 and the destination region 606. The properties of movement for the valve gate assembly 620 can be controlled as desired, including the range and direction of movement, the force of movement, and other facets of the change in position, in accordance with implementations described herein.

Thus, the self-healing microvalve 600 can control the flow of fluids from either the transmission region 604 or the destination region 606 with minimal energy input. When in a passive state, the valve gate assembly 620 can move the valve barrier 610 in connection with the interior wall 608, blocking the opening 615. Thus, the self-healing microvalve in the passive state can prevent the free flow of fluid between the transmission region 604 and the destination region 606. When in an active state, the valve gate assembly 620 can be used to mechanically separate the valve barrier 610 from the interior wall 608. Thus, the self-healing microvalve 600 in the active state can allow free flow of fluid between the transmission region 604 and the destination region 606. Thus, the self-healing microvalve 600 can be actuated only when the flow is desired to control fluid flow between the transmission region 604 and the destination region 606.

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS.

1-4E, but the implementations are not limited to the illustrated structure or application.

The flowcharts and block diagrams in the figures illustrate the architecture, functionality, and operation of possible implementations of systems, methods, devices, and computer program products according to various implementations. In this regard, each block in the flowcharts or block diagrams can represent a module, segment, or portion of code, which can include one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which can include all the features enabling the implementation of the methods described herein and, which when loaded in a processing system, can carry out these methods.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A self-healing microvalve comprising:
  a fluid transfer path including a longitudinal axis;
  a valve barrier, the valve barrier being operatively positioned along the fluid transfer path, the valve barrier being substantially normal to the longitudinal axis;
  a soft hydraulic subassembly, the soft hydraulic subassembly having a fluid-impermeable subassembly membrane, the fluid-impermeable subassembly membrane comprising:
    a subassembly insulating portion defining an interior surface; and
    a subassembly compartment defined by the subassembly insulating portion, the subassembly compartment comprising a dielectric fluid;
  a rigid support having a recess, the recess housing a recess conducting surface and the soft hydraulic subassembly; and
  a valve gate comprising a gate conducting surface, the valve gate being positioned in connection with the valve barrier and the soft hydraulic subassembly, wherein the gate conducting surface is separated from the recess conducting surface by the subassembly compartment, the valve gate being movable, the valve gate extending substantially parallel to the longitudinal axis of the fluid transfer path, the valve gate defining a portion of the fluid transfer path, the fluid transfer path upstream of and downstream of the valve gate being substantially aligned along the longitudinal axis,
  wherein, in the absence of an electric input, the valve gate forms a seal with the valve barrier, and
  wherein, when receiving an electric input, the gate conducting surface and the recess conducting surface become electrostatically attracted to each other and move toward each other such that the valve gate separates from the valve barrier, the valve gate being operatively positioned with respect to the fluid-impermeable subassembly membrane such that, when the gate conducting surface and the recess conducting surface move toward each other, the soft hydraulic subassembly is compressed in a region between the gate conducting surface and the recess conducting surface.

2. The self-healing microvalve of claim 1, wherein the valve gate further comprises an elastomer, and wherein the valve gate is connected to the recess.

3. The self-healing microvalve of claim 1, wherein the valve barrier is in connection with a fluid transport path, the valve barrier partially occluding the fluid transport path.

4. The self-healing microvalve of claim 3, wherein the valve barrier is formed into the fluid transport path.

5. The self-healing microvalve of claim 1, wherein the subassembly insulating portion comprises an elastomer.

6. The self-healing microvalve of claim 1, wherein the gate conducting surface or the recess conducting surface comprise a conductively-doped elastomer.

7. The self-healing microvalve of claim 1, wherein the recess conducting surface is connected with the fluid-impermeable subassembly membrane.

8. A self-healing microvalve comprising:
a fluid transfer path including a longitudinal axis;
a valve barrier, the valve barrier being operatively positioned along the fluid transfer path, the valve barrier being substantially normal to the longitudinal axis;
a soft hydraulic subassembly, the soft hydraulic subassembly having a fluid-impermeable subassembly membrane, the fluid-impermeable subassembly membrane comprising:
a subassembly insulating portion defining an interior surface; and
a subassembly compartment defined by the subassembly insulating portion, the subassembly compartment comprising a dielectric fluid;
a rigid support having a recess, the recess housing a recess conducting surface and the soft hydraulic subassembly; and
a valve gate assembly comprising:
a valve gate;
an elastic portion connecting the valve gate to the rigid support;
a gate conducting surface; and
a receiving element, the valve gate being movable, the valve gate extending substantially parallel to the longitudinal axis of the fluid transfer path, the valve gate defining a portion of the fluid transfer path, the fluid transfer path upstream of and downstream of the valve gate being substantially aligned along the longitudinal axis,
wherein, in the absence of an electric input, the receiving element is positioned to receive the valve barrier to form a seal, and
wherein, when receiving an electric input, the gate conducting surface and the recess conducting surface become electrostatically attracted to each other and move toward each other such that the receiving element and the valve barrier separate from each other, the valve gate being operatively positioned with respect to the fluid-impermeable subassembly membrane such that, when the gate conducting surface and the recess conducting surface move toward each other, the soft hydraulic subassembly is compressed in a region between the gate conducting surface and the recess conducting surface.

9. The self-healing microvalve of claim 8, wherein the valve gate further comprises an elastomer, and wherein the valve gate is connected to the recess.

10. The self-healing microvalve of claim 8, wherein the valve barrier is in connection with a fluid transport path, the valve barrier partially occluding the fluid transport path.

11. The self-healing microvalve of claim 10, wherein the valve barrier is formed into the fluid transport path.

12. The self-healing microvalve of claim 8, wherein the subassembly insulating portion comprises an elastomer.

13. The self-healing microvalve of claim 8, wherein the gate conducting surface or the recess conducting surface comprise a conductively-doped elastomer.

14. The self-healing microvalve of claim 8, wherein the recess conducting surface is connected with the fluid-impermeable subassembly membrane.

15. A self-healing microvalve comprising:
a fluid transfer path including a longitudinal axis;
a valve barrier, the valve barrier being operatively positioned along the fluid transfer path, the valve barrier being substantially normal to the longitudinal axis;
a valve gate assembly, the valve gate assembly comprising:
a soft hydraulic subassembly, the soft hydraulic subassembly having a fluid-impermeable subassembly membrane, the fluid-impermeable subassembly membrane comprising:
a subassembly insulating portion defining an interior surface; and
a subassembly compartment defined by the subassembly insulating portion, the subassembly compartment comprising a dielectric fluid;
a rigid support having a recess, the recess housing a recess conducting surface and the soft hydraulic subassembly; and
a valve gate comprising an elastomer and a gate conducting surface, the valve gate being positioned over the recess and in connection with the soft hydraulic subassembly, wherein the gate conducting surface is separated from the recess conducting surface by the subassembly compartment, the valve gate being movable, the valve gate extending substantially parallel to the longitudinal axis of the fluid transfer path, the valve gate defining a portion of the fluid transfer path, the fluid transfer path upstream of and downstream of the valve gate being substantially aligned along the longitudinal axis,
wherein, in the absence of an electric input, the valve gate forms a seal with the valve barrier, and
wherein, when receiving an electric input, the gate conducting surface and the recess conducting surface become electrostatically attracted to each other and move toward each other such that the valve gate separates from the valve barrier, the valve gate being operatively positioned with respect to the fluid-impermeable subassembly membrane such that, when the gate conducting surface and the recess conducting surface move toward each other, the soft hydraulic subassembly is compressed in a region between the gate conducting surface and the recess conducting surface.

16. The self-healing microvalve of claim 15, wherein the gate conducting surface or the recess conducting surface comprise a conductively-doped elastomer.

17. The self-healing microvalve of claim 15, wherein the recess conducting surface is connected with the fluid-impermeable subassembly membrane.

18. The self-healing microvalve of claim 15, wherein the valve barrier is fluidly attached to the valve gate.

* * * * *